United States Patent
Sallam

(10) Patent No.: US 7,690,034 B1
(45) Date of Patent: Mar. 30, 2010

(54) USING BEHAVIOR BLOCKING MOBILITY TOKENS TO FACILITATE DISTRIBUTED WORM DETECTION

(75) Inventor: Ahmed Sallam, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1190 days.

(21) Appl. No.: 10/938,047

(22) Filed: Sep. 10, 2004

(51) Int. Cl.
    *H04L 29/00* (2006.01)
(52) U.S. Cl. .............................. 726/22; 726/23; 726/24; 726/25
(58) Field of Classification Search .................. 726/22, 726/23, 24, 25
    See application file for complete search history.

(56) References Cited

U.S. PATENT DOCUMENTS

| | | |
|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,440,723 A | 8/1995 | Arnold et al. |
| 5,450,576 A | 9/1995 | Kennedy |
| 5,452,442 A | 9/1995 | Kephart |
| 5,473,769 A | 12/1995 | Cozza |
| 5,530,757 A | 6/1996 | Krawczyk |
| 5,548,532 A | 8/1996 | Menand et al. |
| 5,564,054 A | 10/1996 | Bramnick et al. |
| 5,572,590 A | 11/1996 | Chess |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |

(Continued)

FOREIGN PATENT DOCUMENTS

EP    1 280 039 A    1/2003

(Continued)

OTHER PUBLICATIONS

Richter, J., Microsoft.com web pages (online). "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Carl Colin
(74) *Attorney, Agent, or Firm*—Fenwick & West LLP

(57) ABSTRACT

Behavior blocking mobility token managers track movement of suspicious files within a network. A behavior blocking mobility token manager on a source computer detects an attempt by a process on the source computer to write a file to a target computer. The behavior blocking mobility token manager determines a suspicion level associated with the process, and writes a behavior blocking mobility token containing at least the suspicion level associated with the process to the target computer. A behavior blocking mobility token manager on the target computer detects that a behavior blocking mobility token is being written to the target computer. The behavior blocking mobility token manager reads the behavior blocking mobility token, and determines a suspicion level of the file associated with the behavior blocking mobility token, responsive to contents of the behavior blocking mobility token.

34 Claims, 2 Drawing Sheets

U.S. PATENT DOCUMENTS

| | | | |
|---|---|---|---|
| 5,696,822 | A | 12/1997 | Nachenberg |
| 5,708,776 | A | 1/1998 | Kikinis |
| 5,715,174 | A | 2/1998 | Cotichini et al. |
| 5,715,464 | A | 2/1998 | Crump et al. |
| 5,758,359 | A | 5/1998 | Saxon |
| 5,765,151 | A | 6/1998 | Senator |
| 5,799,088 | A | 8/1998 | Raike |
| 5,802,080 | A | 9/1998 | Westby |
| 5,812,763 | A | 9/1998 | Teng |
| 5,854,759 | A | 12/1998 | Kaliski, Jr. et al. |
| 5,889,943 | A | 3/1999 | Ji et al. |
| 5,919,258 | A * | 7/1999 | Kayashima et al. ............ 726/23 |
| 5,922,072 | A | 7/1999 | Hutchinson et al. |
| 5,951,698 | A | 9/1999 | Chen et al. |
| 5,956,475 | A | 9/1999 | Burckhartt et al. |
| 5,956,481 | A * | 9/1999 | Walsh et al. .................. 726/23 |
| 5,960,170 | A | 9/1999 | Chen et al. |
| 5,974,546 | A | 10/1999 | Anderson |
| 5,978,475 | A * | 11/1999 | Schneier et al. ............. 713/177 |
| 5,978,917 | A | 11/1999 | Chi |
| 5,987,610 | A | 11/1999 | Franczek et al. |
| 6,000,032 | A | 12/1999 | Millard |
| 6,014,744 | A | 1/2000 | McKaughan et al. |
| 6,014,767 | A | 1/2000 | Glaise |
| 6,048,090 | A | 4/2000 | Zook |
| 6,052,709 | A | 4/2000 | Paul et al. |
| 6,061,788 | A | 5/2000 | Reynaud et al. |
| 6,070,244 | A | 5/2000 | Orchier et al. |
| 6,072,830 | A | 6/2000 | Proctor et al. |
| 6,079,016 | A | 6/2000 | Park |
| 6,088,803 | A | 7/2000 | Tso et al. |
| 6,094,731 | A | 7/2000 | Waldin et al. |
| 6,104,872 | A | 8/2000 | Kubota et al. |
| 6,108,799 | A | 8/2000 | Boulay et al. |
| 6,167,434 | A | 12/2000 | Pang |
| 6,167,520 | A * | 12/2000 | Touboul ...................... 726/23 |
| 6,192,379 | B1 | 2/2001 | Bekenn |
| 6,199,181 | B1 | 3/2001 | Rechef et al. |
| 6,275,938 | B1 | 8/2001 | Bond et al. |
| 6,338,141 | B1 | 1/2002 | Wells |
| 6,357,008 | B1 | 3/2002 | Nachenberg |
| 6,370,648 | B1 | 4/2002 | Diep |
| 6,493,007 | B1 | 12/2002 | Pang |
| 6,535,891 | B1 | 3/2003 | Fisher et al. |
| 6,552,814 | B2 | 4/2003 | Okimoto et al. |
| 6,611,925 | B1 | 8/2003 | Spear |
| 6,622,150 | B1 | 9/2003 | Kouznetsov et al. |
| 6,678,734 | B1 | 1/2004 | Haatainen et al. |
| 6,697,950 | B1 | 2/2004 | Ko |
| 6,701,348 | B2 * | 3/2004 | Sommerer ................. 709/206 |
| 6,721,721 | B1 | 4/2004 | Bates et al. |
| 6,748,534 | B1 | 6/2004 | Gryaznov et al. |
| 6,763,462 | B1 | 7/2004 | Marsh |
| 6,813,712 | B1 | 11/2004 | Luke |
| 6,847,984 | B1 * | 1/2005 | Midgley et al. ............. 707/204 |
| 6,851,057 | B1 | 2/2005 | Nachenberg |
| 6,910,134 | B1 | 6/2005 | Maher et al. |
| 6,944,772 | B2 * | 9/2005 | Dozortsev .................. 713/180 |
| 7,024,548 | B1 * | 4/2006 | O'Toole, Jr. .................... 713/1 |
| 7,080,000 | B1 * | 7/2006 | Cambridge ................. 703/21 |
| 7,103,913 | B2 * | 9/2006 | Arnold et al. ............... 726/22 |
| 7,152,240 | B1 * | 12/2006 | Green et al. .................... 726/4 |
| 7,310,818 | B1 * | 12/2007 | Parish et al. ................ 726/24 |
| 7,343,624 | B1 * | 3/2008 | Rihn et al. .................. 726/24 |
| 2002/0004908 | A1 | 1/2002 | Galea |
| 2002/0035696 | A1 | 3/2002 | Thacker |
| 2002/0046275 | A1 | 4/2002 | Crosbie et al. |
| 2002/0083175 | A1 | 6/2002 | Afek et al. |
| 2002/0091940 | A1 | 7/2002 | Wellborn et al. |
| 2002/0116635 | A1 * | 8/2002 | Sheymov .................... 713/200 |
| 2002/0157008 | A1 | 10/2002 | Radatti |
| 2002/0162015 | A1 | 10/2002 | Tang |
| 2002/0178374 | A1 | 11/2002 | Swimmer et al. |
| 2003/0023865 | A1 | 1/2003 | Cowie et al. |
| 2003/0051026 | A1 | 3/2003 | Carter et al. |
| 2003/0065926 | A1 | 4/2003 | Schultz et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0140049 | A1 | 7/2003 | Radatti |
| 2003/0159070 | A1 * | 8/2003 | Mayer et al. ................ 713/201 |
| 2003/0191966 | A1 | 10/2003 | Gleichauf |
| 2003/0212902 | A1 | 11/2003 | van der Made |
| 2003/0212913 | A1 * | 11/2003 | Vella .......................... 713/202 |
| 2003/0236995 | A1 | 12/2003 | Fretwell, Jr. |
| 2004/0015712 | A1 | 1/2004 | Szor |
| 2004/0015726 | A1 | 1/2004 | Szor |
| 2004/0030913 | A1 | 2/2004 | Liang et al. |
| 2004/0111632 | A1 * | 6/2004 | Halperin ..................... 713/200 |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2004/0225877 | A1 * | 11/2004 | Huang ........................ 713/100 |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2005/0216762 | A1 * | 9/2005 | Peikari ....................... 713/200 |
| 2005/0273856 | A1 * | 12/2005 | Huddleston ................. 726/22 |
| 2006/0015939 | A1 * | 1/2006 | Aston et al. ................. 726/22 |
| 2006/0064755 | A1 | 3/2006 | Azadet et al. |

FOREIGN PATENT DOCUMENTS

| | | |
|---|---|---|
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System for Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. of SPIE Conference on Sensors, and Command, Control, Communications and Intelligence, Orlando, Apr. 2002.

* cited by examiner

USING BEHAVIOR BLOCKING MOBILITY TOKENS TO FACILITATE DISTRIBUTED WORM DETECTION

TECHNICAL FIELD

This patent application is related to U.S. Pat. No. 7,337,327, filed on Mar. 30, 2004, titled "Using Mobility Tokens to Observe Malicious Mobile Code," and having the same assignee (the mobility tokens application). The mobility tokens application is hereby incorporated by reference in its entirety.

RELATED APPLICATIONS

This patent application is related to U.S. patent application Ser. No. 10/814,843, filed on Mar. 30, 2004, titled "Using Mobility Tokens to Observe Malicious Mobile Code," and having the same assignee (the mobility tokens application). The mobility tokens application is hereby incorporated by reference in its entirety.

BACKGROUND

Networked computers are vulnerable to malicious computer code attacks, such as worms, viruses and Trojan horses. As used herein, "malicious computer code" is any code that enters a computer without an authorized user's knowledge and/or without an authorized user's consent.

Malicious mobile executable files comprise a major security threat. Mobile executable files are typically not signed, and do not carry a digital signature. Thus, the identity of their author(s) is unknown, and they should be suspected of being potentially malicious. For example, worms are often spread as a form of malicious mobile executable file.

Malicious mobile executable files such as worms often utilize open shares to spread themselves within networks. However, legitimate code can also be copied within a network this way. It is advantageous to be able to determine whether code remotely copied across a network is malicious or not, so that malicious code can be blocked and eliminated, and legitimate code copied as desired.

Some malicious code management strategies involve determining a suspicion level of mobile files, and blocking files that appear to be malicious. This type of blocking system can convict and block certain operations of malicious mobile code upon the detection of their propagation, and upon reaching a sufficient level of confidence about the suspiciousness of their operations. Blocking systems typically attempt to identify worms spreading across a network by comparing incoming binary files with the a known image of a worm, or an image of the copying application. This technique is sufficient to identify worms that copy themselves without self-modification and without employing identity hiding techniques. However, many of today's worms are polymorphous or metamorphic, changing their binary image as they spread. Dynamic worms pose a challenge to today's behavior blocking systems.

Furthermore, future generations of computer worms are likely to be even harder to detect than contemporary worms, thus providing an ongoing challenge to behavior blocking systems. For example, a future worm might be designed such that it communicates with a normal web server through the legitimate hypertext transfer protocol (HTTP), and then downloads different malicious binary images to local random access memory only. Then, the worm could be downloaded binaries to open remote network shares, without writing them to disk locally. Such a case would create a big challenge to contemporary behavioral based worm detection systems.

There exist other scenarios (actual and potential) that are also not effectively covered by current behavior blocking systems. For example, consider the following case. A worm arrives at a local machine, and the local blocking system classifies the file as being suspicious, but does not convict it as being malicious. The worm is either polymorphous or capable of downloading new malicious binaries from the Internet to local random access memory. The worm then copies new malicious binaries to remote open network shares. The behavior blocking system on the remote computer allows the new binaries to be copied, since the parent application is classified as being only suspicious and is not yet convicted. Later, the local copy of the worm is convicted by the behavior blocking component on the local computer. The new remotely copied binaries are still not convicted on the remote computer, and are considered as being only suspicious applications. The remote user then activates the remote copies on the remote machine, and the worm attacks that computer and spreads further to other computers. So, although the worm is eventually convicted on the local machine, its distributed new binaries are not convicted, and are still active within the outer network.

What is needed are methods, systems and computer readable media that extend a malicious could blocking system to be able to detect and block dynamic malicious code, such as polymorphous worms, metamorphic worms, worms that copy download new binary images to remote computers and worms that are only later convicted locally.

SUMMARY OF INVENTION

The present invention comprises methods, systems and computer readable media for tracking movement of suspicious files within a network. In some embodiments, a behavior blocking mobility token manager on a source computer detects an attempt by a process on the source computer to write a file to a target computer. The behavior blocking mobility token manager determines a suspicion level associated with the process, and writes a behavior blocking mobility token containing at least the suspicion level associated with the process to the target computer. In some embodiments, the behavior blocking mobility token manager writes at least one instruction and/or rule directed to the target computer in the behavior blocking mobility token. A behavior blocking mobility token manager on the target computer detects that a behavior blocking mobility token is being written to the target computer. The behavior blocking mobility token manager reads the behavior blocking mobility token, and determines a suspicion level of the file associated with the behavior blocking mobility token, responsive to contents of the behavior blocking mobility token. In some embodiments, the behavior blocking mobility token manager executes at least one instruction embedded in mobility token from the source computer. In other embodiments, the behavior blocking mobility token manager on the target computer processes the file associated with the behavior blocking mobility token responsive to one or more rules sent by the behavior blocking mobility token manager on source computer and/or originating on the target computer.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specifi-

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
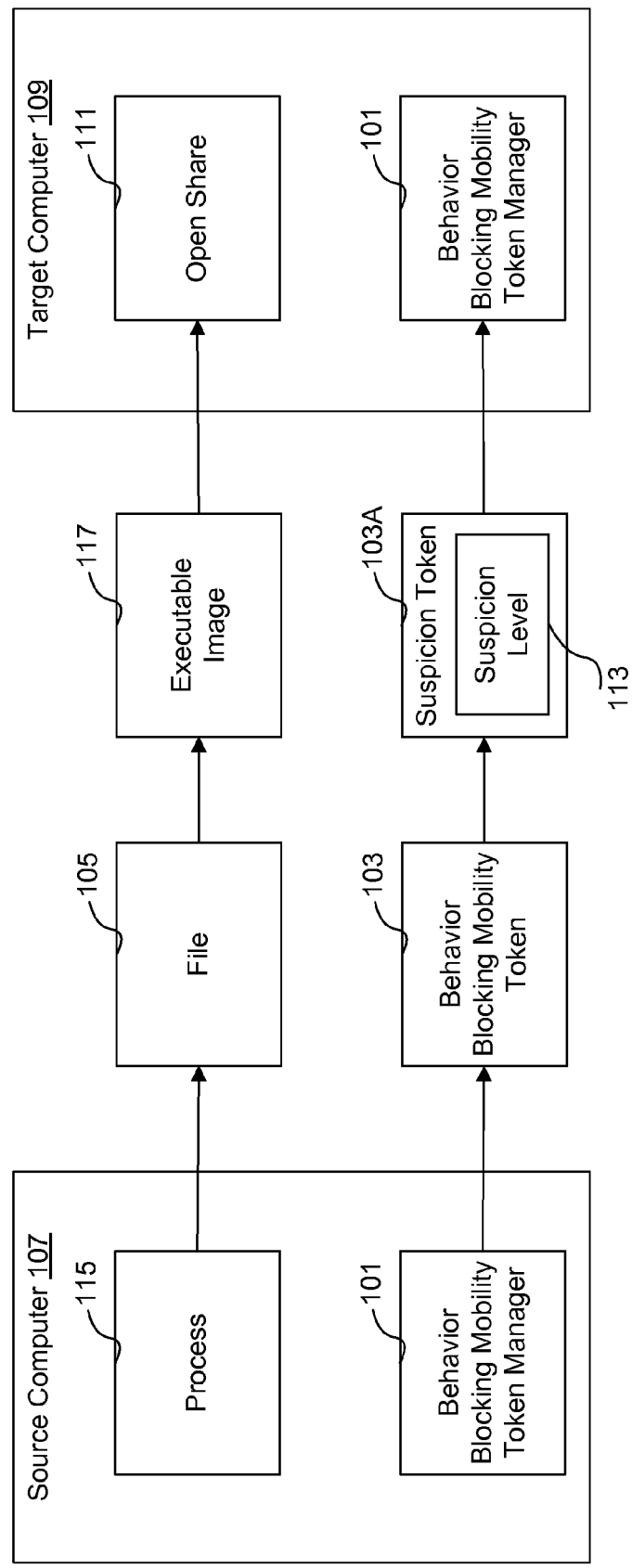
FIG. 1 is a block diagram illustrating a high level overview of a source computer and a target computer processing suspicion mobility tokens, according to some embodiments of the present invention.

FIG. 1 illustrates a high level overview of a system 100 for performing some embodiments of the present invention. A behavior blocking mobility token manager 101 uses behavior blocking mobility tokens 103 to track the movement of suspicious mobile files 105. It is to be understood that although the behavior blocking mobility token manager 101 is illustrated as a single entity, as the term is used herein a behavior blocking mobility token manager 101 refers to a collection of functionalities which can be implemented as software, hardware, firmware or any combination of the three. Where a behavior blocking mobility token manager 101 is implemented as software, it can be implemented as a standalone program, but can also be implemented in other ways, for example as part of a larger program, as a plurality of separate programs, or as one or more statically or dynamically linked libraries.

In some embodiments of the present invention, behavior blocking mobility token managers 101 are instantiated on multiple computers 107, 109 within a network. Thus, when a file 105 is remotely copied from a source computer 107 to a target computer 109, the behavior blocking mobility token manager 101 on the target computer 109 can utilize information gleaned by the behavior blocking mobility token manager 101 on the source computer 107.

To transmit information concerning files 105 remotely copied by application programs 115 to target computers 109, a behavior blocking mobility token manager 101 can utilize three different types of behavior blocking mobility tokens 103: suspicion tokens 103A, conviction tokens 103B and clearance tokens 103C. It is to be understood that these names are simply exemplary labels for behavior blocking mobility tokens 103 performing various functions. The separate names are used herein for readability, but suspicion tokens 103A, conviction tokens 103B and clearance tokens 103C are all to be considered behavior blocking mobility tokens 103. The details concerning how to create mobility tokens 103 and copy them from a source computer 107 to a target computer 109 are disclosed in the mobility tokens application.

A behavior blocking mobility token manager 101 typically automatically creates a suspicion token 103A on the remote network shared location 111 every time a new file 105 is remotely created by a suspicious application 115 running on the local computer 107. Depending on the context, the suspicious application 115 is referred to herein as a: process, writing process, suspicious process, application, application program, suspicious application, parent application, and local application. Note that the behavior blocking mobility token manager 101 can use any methodology to determine what constitutes a suspicious application 115. For example, the behavior blocking mobility token manager 101 can make such a determination based upon a suspicion level 113 generated by local behavior blocking functionality, based upon the source of the application 115 (e.g., e-mail, Internet download), etc. A suspicion token 103A allows the behavior blocking mobility token manager 101 on a source computer 107 to send information to the target computer 109 concerning about the potential suspiciousness of copied files 105.

A suspicion token 103A contains at least the suspicion level 113 pertaining to the application 115 on the source computer 107 that is writing the file 105 to the target computer 109. A suspicion level 113 can be generated by the behavior blocking mobility token manager 101, or gleaned by the behavior blocking mobility token manager 101 from, e.g., local behavior blocking functionality or anti-malicious code software. In various embodiments, suspicion tokens 103A can contain additional data concerning the writing process 115, such as its name, associated security information, additional associated suspiciousness information, its installation time on the source computer 107, the source of its installation, data contained in a behavior blocking mobility token 101 associated with the process 115, its digital signature, its version number, its most recent modification date and/or its most recent modification time. A suspicion token 103A can also contain data concerning the source computer 107, such as its IP address, computer name and/or primary domain controller name.

In some embodiments, a behavior blocking mobility token manager 101 running on a local computer 107 observes all the outgoing network file operations. In such embodiments, when a process 115 running on the local computer 107 writes a new file 105 to a remote computer 109, the behavior blocking mobility token manager 101 determines the suspicion level 113 of the process 115, and writes a suspicion token 103A containing at least this information to the folder on the remote computer 109 in which the new file 105 is created.

In some embodiments, the behavior blocking mobility token manager 101 writes a suspicion token 103A whenever any process 115 writes a file 105 to a remote target computer 109. In other embodiments, suspicion tokens 103A are only written when a suspicious process 115 writes remotely, or when any process 115 (or when a suspicious process 115) writes an executable image 117 to a remote location. In various embodiments an executable image 117 can by defined narrowly as executable code (e.g., a .exe file or a dynamic link library) or defined loosely as any image which contains instructions to a computer at any level, such as a script file.

Recall that the suspicion token 103A written to the target computer 109 contains information concerning the parent application 115 that has created the new file 105. This information is used by the behavior blocking mobility token manager 101 on the remote computer 109 to determine how to treat this newly created file 105.

The behavior blocking mobility token manager 101 on the remote computer 109 recognizes when a suspicion token 103A is being written thereto. The behavior blocking mobility token manager 101 reads the suspicion token 103A, and determines a suspicion level 113 to associate with the newly created file 105. From the contents of the suspicion token 103A, the behavior blocking mobility token manager 101 can glean at least the suspiciousness level 113 of the parent application 115. As noted above, the suspicion token 103A can also contain other relevant data, for example the time period within which the parent application 115 is considered to be malicious. In some embodiments, suspicion tokens 103A are time sensitive, and expire after certain period of time. This can be, for example, the time within which the parent application 115 is assumed to be suspicious.

A suspicion token 103A can also used to exchange instructions between behavior blocking mobility token managers 101 on local 107 and remote computers 109. For example, the behavior blocking mobility token manager 101 running on the local computer 107 allows a system administrator or other authorized party to specify rules to control the execution of files 105 created on remote computers 109 by local suspicious applications 115. The behavior blocking mobility token managers 101 can embed a corresponding instruction in a suspicion token 103A, which will be recognized by behavior blocking mobility token managers 101 on target computers 109. A behavior blocking mobility token manager 101 on a target computer 109 can then execute the instruction.

In some embodiments, the system administrator of the local computer 107 can specify rules that apply to the creation of suspicion tokens 103A. In some embodiments, a system administrator at the remote computer 109 can specify rules that apply to receiving suspicion tokens 103A from source computers 107.

Rules can, for example, direct a behavior blocking mobility token manager 101 to block the execution of the newly created file 105, so long as the parent application 115 is considered suspicious. This will protect the target computer 109 from attacks by worms that have not yet been convicted at the source computer 107.

The behavior blocking mobility token manager 101 on the remote computer 109 can establish a new set of rules for each type of suspicious mobile executable image 117 copied remotely by a suspicious application 115. The rules could be defined based on any of the information provided within the suspicion token 103A. For instance, the behavior blocking mobility token manager 101 might request blocking certain executable images 117 from running based on the suspicion level 113 of their parent application 115 and the time the parent application 115 arrived to the source computer 107.

The rule and instruction based features allow system administrators to define new mobile behavior blocking rules on both the source 107 and the target computers 109 to control how the behavior blocking information should be exported and imported between both protected computers 107, 109.

Figure 2:
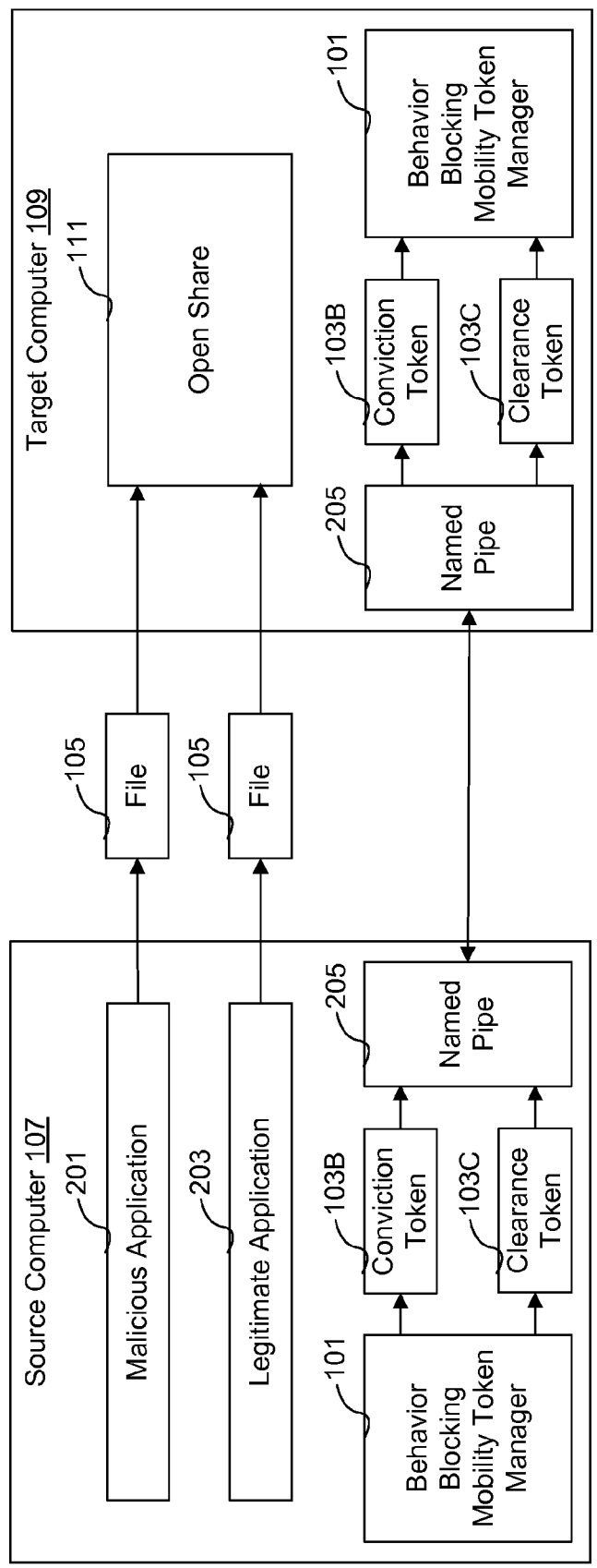
FIG. 2 is a block diagram illustrating a high level overview of a source computer and a target computer processing conviction and clearance mobility tokens, according to some embodiments of the present invention.

Turning to FIG. 2, in some embodiments the behavior blocking mobility token manager 101 running on a source computer 107 generates and distributes a conviction token 103B when a local application 115 that has copied at least one file 105 remotely is confirmed as being a malicious application 201. In such a case, the behavior blocking mobility token manager 101 writes a conviction token 103B to each remote network location where it previously wrote a suspicion token 103A corresponding to the now convicted application 201. The conviction token 103A informs the behavior blocking mobility token manager 101 on the remote computer that the file 105 in question was written thereto by malicious code 201. The behavior blocking mobility token manager 101 on the remote computer 109 recognizes the conviction token 103B, and in response treats the associated file as malicious.

In some embodiments, when a behavior blocking mobility token manager 101 on a source computer 107 determines that an application 115 that previously wrote at least one file 105 remotely is a legitimate application 203, the behavior blocking mobility token manager 101 generates and distributes a clearance token 103C. A clearance token 103C is similar to a conviction token 103B, except that it informs behavior blocking mobility token managers 101 on target computers 109 that an application 115 is no longer considered suspicious by the source computer 107. The behavior blocking mobility token manager 101 on a target computer 109 recognizes an arriving clearance token 103C, and in response treats the associated file 105 as legitimate.

When distributing either conviction 103B or clearance tokens 103C, the behavior blocking mobility token manager 101 on a source computer 107 notes all of the remote places where it previously wrote a suspicion token 103A concerning the file 105 in question. The local behavior blocking mobility token manager 101 then writes the corresponding conviction token 103B or clearance token 103C to all such remote locations.

As noted above, a suspicion token 103A is generated and deployed at the time a local application 115 writes a file 105 to a remote location. As disclosed in the mobility tokens application, this guarantees that the manager 101 can write successfully to the remote location, as the share is already available and the current user has proper access rights to copy the file 105 there. However, these rights may not be in effect when conviction tokens 103B and the clearance tokens 103C are deployed, as the share might no longer be available, or the current user might not have proper access rights. In one embodiment, a behavior blocking mobility token manager 101 addresses this issue by only sending a conviction token 103B or a clearance tokens 103C when a network share is still available upon conviction or clearance of a suspicious application 115. If a user removes the network share before that time, the behavior blocking mobility token manager 101 can follow directives specified in the behavior blocking rules to handle such a case.

In another embodiment, the behavior blocking mobility token managers 101 on both computers 107, 109 communicate through named pipes 205 in order to exchange conviction tokens 103B and the clearance tokens 103C. For example, under Windows NT®, named pipe 301 operations are executed by the network file sharing protocol, which guarantees that the network port number is not blocked by any network based firewall system as long as applications 115 can copy files 105 remotely.

Another similar case is when a source computer 107 has been taken out of the network or is in a deadlock state. This case can be interpreted by the behavior blocking mobility token manager 101 on the target computer 109 as an indication of the maliciousness of files 105 copied from that source computer 107. The behavior blocking mobility token manager 101 can associate a time-out with tokens 103 originating therefrom, such that if the source computer 107 fails to communicate through named pipes 205 within the specified time, the behavior blocking mobility token manager 101 on the target computer 109 takes stronger action against the copied files 105, for example by adjudicating them to be malicious.

The following use cases provide examples of the behavior blocking mobility token manager 101 in action, according to some embodiments of the present invention.

Use Case One:
- An application 115 arrives at a computer 107 from the outside network.
- Based on behavior blocking rules, the newly arrived application 115 is adjudicated as being suspicious.
- The application 115 performs certain malicious operations locally, and therefore, its suspicious level 113 is increased.

The suspicious application 115 writes a new binary file 105 to a remote computer 109 via an open network share.

The behavior blocking mobility token manager 101 writes a corresponding suspicion token 103A to the same remote network shared folder on the target computer 109.

The behavior blocking mobility token manager 101 on the target computer 109 reads the suspicion token 103A and adjudicates the newly created file 105 as being suspicious.

Use Case Two:

An application 115 arrives at a computer 107 from the outside network.

Based on behavior blocking rules, the newly arrived application 115 is adjudicated as being suspicious.

The suspicious application 115 writes a new binary file 105 to a remote computer 109 via an open network share.

The behavior blocking mobility token manager 101 writes a corresponding suspicion token 103A to the same remote network shared folder on the target computer 109.

The behavior blocking rules on the remote computer 109 do not allow the newly copied file 105 to be executed until the writing application 115 is cleared by the source computer 107.

A user tries to run the newly created file 105 on the target computer 109, and the behavior blocking mobility token manager 101 blocks the execution thereof, and displays a message to the end user indicating that the file 105 is not trusted.

The parent application 115 is identified as being legitimate code 203 by the source computer 107.

The behavior blocking mobility token manager 101 on the source computer 107 generates a clearance token 103B, and writes it to the remote computer 109.

The behavior blocking mobility token manager 101 on the target computer 109 reads the clearance token 103B and adjudicates the file 105 as being legitimate.

The user tries to execute the file 105 on the target computer 109, and the behavior blocking mobility token manager 101 allows the file 105 to run.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for tracking movement of suspicious files within a network, the method comprising the steps of:
   detecting at a source computer a process on the source computer writing a file to a folder at a target computer;
   determining at the source computer a suspicion level associated with the process;
   writing by the source computer a first behavior blocking mobility token containing at least the suspicion level associated with the process to the same folder at the target computer;
   subsequent to writing the file and the first behavior blocking mobility token to the same folder at the target computer, determining by the source computer whether the process comprises malicious code; and
   writing by the source computer a second behavior blocking mobility token to the target computer, the second behavior blocking mobility token informing the target computer whether the process that wrote the file comprises malicious code.

2. The method of claim 1 wherein:
   the first behavior blocking mobility token contains at least one datum concerning the source computer from a group of data consisting of:
   an IP address;
   a computer name; and
   a primary domain controller name.

3. The method of claim 1 wherein:
   the first behavior blocking mobility token contains at least one datum concerning the process from a group of data consisting of:
   a name;
   security information;
   additional associated suspiciousness information;
   an installation time;
   an installation source;
   data contained in a behavior blocking mobility token associated with the process;
   a digital signature;
   a version number;
   a last modification date; and
   a last modification time.

4. The method of claim 1 further comprising:
   writing at least one instruction directed to the target computer in the first behavior blocking mobility token.

5. The method of claim 1 further comprising:
   writing at least one rule directed to the target computer in the first behavior blocking mobility token.

6. The method of claim 1 wherein the second behavior blocking mobility token is written to the target computer through a named pipe.

7. A computer implemented method for tracking movement of suspicious files within a network, the method comprising the steps of:
   detecting a file being written to a folder at a target computer by a source computer;
   detecting that a first behavior blocking mobility token associated with the file is being written to the same folder at the target computer by the source computer;
   reading the first behavior blocking mobility token;
   determining a suspicion level of the file associated with the first behavior blocking mobility token, responsive to contents of the behavior blocking mobility token; and
   subsequent to detecting the file and the first behavior blocking mobility token being written to the same folder at the target computer, detecting a second behavior blocking mobility token being written to the target computer, the second behavior blocking mobility token indicating whether the file was written to the target computer by malicious code on the source computer, wherein the source computer determines whether the file was written to the target computer by malicious code and writes the second behavior blocking mobility token to the target computer.

8. The method of claim 7 further comprising:
reading at least one instruction from the source computer in the first behavior blocking mobility token; and
executing the at least one instruction.

9. The method of claim 7 further comprising:
reading at least one rule from the source computer in the first behavior blocking mobility token; and
processing the file associated with the first behavior blocking mobility token responsive to the at least one rule.

10. The method of claim 7 further comprising:
processing the file associated with the first behavior blocking mobility token responsive to at least one rule originating at the target computer.

11. The method of claim 7 further comprising:
in response to at least the suspicion level, treating the file associated with the first behavior blocking mobility token as being suspicious.

12. The method of claim 7 further comprising:
in response to at least the suspicion level, rejecting the file associated with the first behavior blocking mobility token.

13. The method of claim 7 further comprising:
responsive to the second behavior mobility token indicating that the file was written to the target computer by malicious code, treating the associated file as malicious code.

14. The method of claim 7 wherein the second behavior mobility token is written to the target computer through a named pipe.

15. The method of claim 7 further comprising:
responsive to the second behavior mobility token indicating that the file was written to the target computer by legitimate code, treating the associated file as legitimate code.

16. The method of claim 7 further comprising:
responsive to not receiving communication from the source computer for a specified period of time, raising the suspicion level of the associated file.

17. A computer readable storage medium containing an executable computer program product for tracking movement of suspicious files within a network, the computer program product comprising:
program code for detecting at a source computer a process on the source computer writing a file to a folder at a target computer;
program code for determining at the source computer a suspicion level associated with the process;
program code for writing by the source computer a first behavior blocking mobility token containing at least the suspicion level associated with the process to the same folder at the target computer;
program code for determining by the source computer whether the process comprises malicious code subsequent to writing the file and the first behavior blocking mobility token to the same folder at the target computer; and
program code for writing by the source computer a second behavior blocking mobility token to the target computer, the second behavior blocking mobility token informing the target computer whether the process that wrote the file comprises malicious code.

18. The computer program product of claim 17 further comprising:
program code for writing at least one instruction directed to the target computer in the first behavior blocking mobility token.

19. The computer program product of claim 17 further comprising:
program code for writing at least one rule directed to the target computer in the first behavior blocking mobility token.

20. A computer readable storage medium containing an executable computer program product for tracking movement of suspicious files within a network, the computer program product comprising:
program code for detecting a file being written to a folder at a target computer by a source computer;
program code for detecting that a first behavior blocking mobility token associated with the file is being written to the same folder at the target computer by the source computer;
program code for reading the first behavior blocking mobility token;
program code for determining a suspicion level of the file associated with the first behavior blocking mobility token, responsive to contents of the behavior blocking mobility token; and
program code for detecting a second behavior blocking mobility token being written to the target computer subsequent to detecting the file and the first behavior blocking mobility token being written to the same folder at the target computer, the second behavior blocking mobility token indicating whether the file was written to the target computer by malicious code on the source computer, wherein the source computer determines whether the file was written to the target computer by malicious code and writes the second behavior blocking mobility token to the target computer.

21. The computer program product of claim 20 further comprising:
program code for reading at least one instruction from the source computer in the first behavior blocking mobility token; and
program code for executing the at least one instruction.

22. The computer program product of claim 20 further comprising:
program code for reading at least one rule from the source computer in the first behavior blocking mobility token; and
program code for processing the file associated with the first behavior blocking mobility token responsive to the at least one rule.

23. The computer program product of claim 20 further comprising:
program code for processing the file associated with the behavior blocking mobility token responsive to at least one rule originating at the target computer.

24. The computer program product of claim 20 further comprising:
responsive to the second behavior mobility token indicating that the file was written to the target computer by malicious code, treating the associated file as malicious code.

25. The computer program product of claim 20 further comprising:

responsive to the second behavior mobility token indicating that the file was written to the target computer by legitimate code, program code for treating the associated file as legitimate code.

26. A computer system having a computer-readable storage medium having executable computer program instructions embodied therein for tracking movement of suspicious files within a network, the computer system computer program instructions comprising:
a software portion configured to detect at a source computer a process on the source computer writing a file to a folder at a target computer;
a software portion configured to determine at the source computer a suspicion level associated with the process;
a software portion configured to write by the source computer a first behavior blocking mobility token containing at least the suspicion level associated with the process to the same folder at the target computer;
a software portion configured to determine by the source computer whether the process comprises malicious code subsequent to writing the file and the first behavior blocking mobility token to the same folder at the target computer; and
a software portion configured to write by the source computer a second behavior blocking mobility token to the target computer, the second behavior blocking mobility token informing the target computer whether the process that wrote the file comprises malicious code.

27. The computer system of claim 26 further comprising:
a software portion configured to write at least one instruction directed to the target computer in the first behavior blocking mobility token.

28. The computer system of claim 26 further comprising:
a software portion configured to write at least one rule directed to the target computer in the first behavior blocking mobility token.

29. A computer system having a computer-readable storage medium having executable computer program instructions embodied therein for tracking movement of suspicious files within a network, the computer program instructions comprising:
a software portion configured to detect a file being written to a folder at a target computer by a source computer;
a software portion configured to detect that a first behavior blocking mobility token associated with the file is being written to the same folder at the target computer by the source computer;
a software portion configured to read the first behavior blocking mobility token;
a software portion configured to determine a suspicion level of the file associated with the first behavior blocking mobility token, responsive to contents of the behavior blocking mobility token; and
a software portion configured to detect a second behavior blocking mobility token being written to the target computer subsequent to detecting the file and the first behavior blocking mobility token being written to the same folder at the target computer, the second behavior blocking mobility token indicating whether the file was written to the target computer by malicious code on the source computer, wherein the source computer determines whether the file was written to the target computer by malicious code and writes the second behavior blocking mobility token to the target computer.

30. The computer system of claim 29 further comprising:
a software portion configured to read at least one instruction from the source computer in the first behavior blocking mobility token; and
a software portion configured to execute the at least one instruction.

31. The computer system of claim 29 further comprising:
a software portion configured to read at least one rule from the source computer in the first behavior blocking mobility token; and
a software portion configured to process the file associated with the first behavior blocking mobility token responsive to the at least one rule.

32. The computer system of claim 29 further comprising:
a software portion configured to process the file associated with the first behavior blocking mobility token responsive to at least one rule originating at the target computer.

33. The computer system of claim 29 further comprising:
responsive to the second behavior mobility token indicating that the file was written to the target computer by malicious code, a software portion configured to treat the associated file as malicious code.

34. The computer system of claim 29 further comprising:
responsive to the second behavior mobility token indicating that the file was written to the target computer by legitimate code, a software portion configured to treat the associated file as legitimate code.

* * * * *